March 9, 1965     R. E. OCHS, JR., ETAL     3,172,221
ELECTRICAL APPARATUS
Filed Sept. 12, 1962
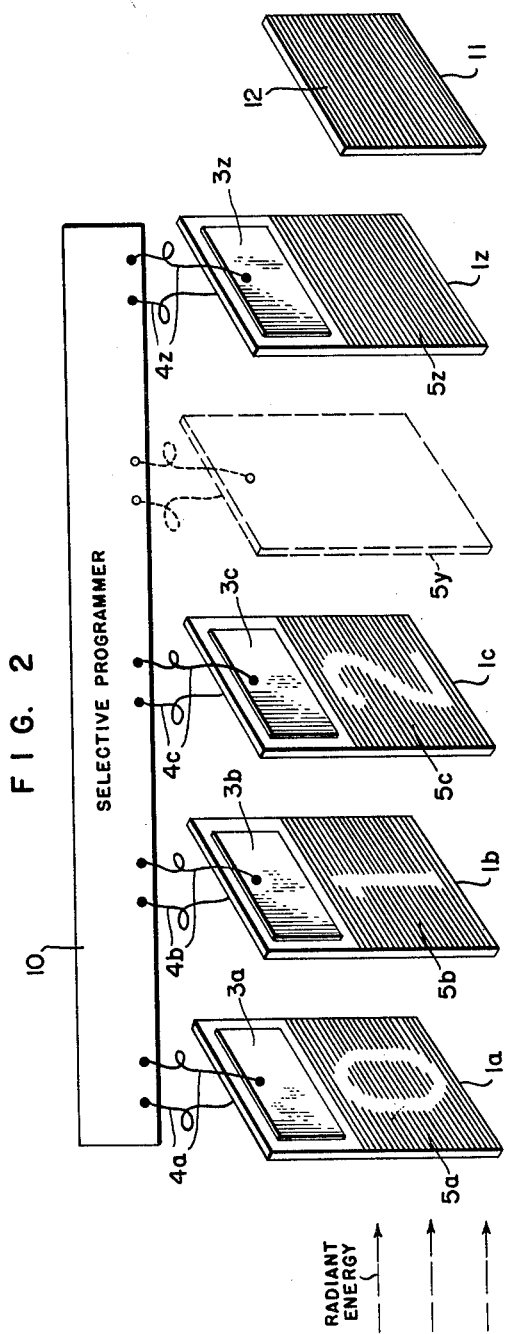
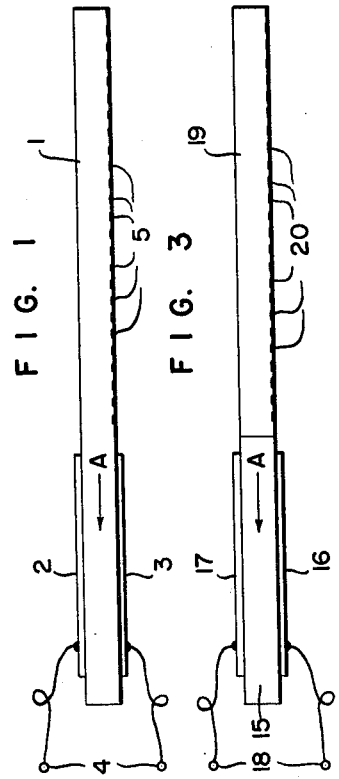
INVENTORS.
ROGER K. STRONG
BY ROBERT E. OCHS, JR.
ATTORNEY.

United States Patent Office 3,172,221
Patented Mar. 9, 1965

3,172,221
ELECTRICAL APPARATUS
Robert E. Ochs, Jr., Doylestown, and Roger K. Strong, Lansdale, Pa., assignors to Honeywell Inc., a corporation of Delaware
Filed Sept. 12, 1962, Ser. No. 223,168
3 Claims. (Cl. 40—53)

This invention relates to display indicators. More specifically, the present invention relates to electrically actuated display indicators.

An object of the present invention is to provide an improved electrically actuated display indicator.

Another object of the present invention is to provide an improved display indicator for selectively displaying desired representations for direct visual viewing.

Still another object of the present invention is to provide an improved display indicator for selectively presenting desired representations suitable for recording by ultra-violet recording techniques.

A further object of the present invention is to provide an improved display indicator actuated by piezoelectric means.

A still further object of the present invention is to provide an improved display indicator, as presented herein, which is characterized by a simplicity of operation and construction.

In accomplishing these and other objects, there is provided, in accordance with this invention, a display indicator including a plurality of transparent piezoelectric slabs each having a pair of electrodes for establishing a potential across the associated slab and a plurality of parallel opaque lines on one surface of each slab arranged to form a desired display representation. The opaque lines are separated by transparent areas having widths substantially equal to the width of the lines. The lines are arranged transversely to the direction of a motion of the piezoelectric slab which results from the application of a potential to the pair of electrodes. The slabs are arranged in a stack with the opaque lines and transparent areas of the slabs in alignment. A shutter means for radiant energy is provided comprising two elements each having opaque and transparent portions similar to those of the slabs, but arranged with the opaque areas of one element aligned with the transparent areas of the other element to block any radiant energy from passing through the two elements. An indicator display is produced by applying a signal potential to the electrodes of a desired slab to effect a movement of its opaque areas into the aligned transparent areas of the other slabs. The shutter means is then opened by applying a signal potential to one of the shutter elements to align the shutter means' transparent areas to allow the radiant energy to pass through the stack of slabs.

A better understanding of this invention may be had from the following detailed description when read in connection with the accompanying drawing in which:

FIG. 1 is a pictorial representation of a side view of a novel display element for use in the present invention;

FIG. 2 is a pictorial representation of a display indicator embodying the present invention;

FIG. 3 is a pictorial representation of a side view of a novel display element also suitable for use in the present invention and having a somewhat different structure from the element shown in FIG. 1.

Referring to FIG. 1 in more detail, there is shown a novel display element embodying the present invention and comprising a slab of transparent piezoelectric material 1; e.g., quartz. A pair of electrodes 2 and 3 are attached to opposite sides, respectively, of the slab 1. The electrodes 2 and 3 are arranged, with respect to the crystal axis of the slab 1, to effect a shortening of the slab 1 in the direction "A" in response to a signal potential applied to the electrodes 2 and 3. A pair of connecting wires 4 are provided for applying a potential to the electrodes 2 and 3.

The electrodes 2 and 3 are arranged to cover a portion of the surfaces of the slab 1 to which they are attached. The rest of the surface of the slab 1 adjacent to one of the electrodes 2 and 3 is provided with a plurality of opaque lines 5 extending transversely to the direction of induced motion "A." These lines 5 may be formed on the surface of slab 1 by any suitable prior art technique. For example, the lines 5 may be printed by the photographic and etch technique used to make printed circuit boards. Conversely, the lines 5 may be ruled into the surface by the methods used to make diffraction gratings and the groove filled with an opaque substance. In either case, the result is a pattern of alternating opaque and transparent areas having equal widths and extending across the surface of the slab 1 transversely to the direction of the motion "A." Further, the width of the opaque and transparent areas is determined with respect to the magnitude of the signal induced motion "A." Thus, the width of these areas is arranged to provide a movement of an opaque area due to the motion "A" to a new spatial position substantially identical with the position previously occupied by a transparent area. In other words, the motion "A" is effective to move the opaque areas to the position previously occupied by the transparent areas. It may be noted that to insure that this displacement is effective to provide the aforesaid substitution operation, the width of the opaque areas may be made slightly greater than the width of the transparent areas.

Referring now to FIG. 2, there is shown a display indicator embodying the present convention. As shown therein, the indicator comprises a plurality of transparent piezoelectric slabs $1a$, $1b$, $1c$ . . . $1z$, each having a structure similar to the display element shown in FIG. 1. In other words, each of the slabs $1a$, etc. shown in FIG. 2 has a pair of electrodes 2 and 3 and a plurality of opaque lines 5 extending across a surface of the slab transversely to a signal potential induced crystal motion "A." Thus, slab $1a$ has a pair of electrodes, of which only electrode $3a$ is shown, and a plurality of opaque lines $5a$.

The opaque lines $5a$ on the slab $1a$ are arranged to define a desired representation; e.g., numbers, by having portions of the opaque areas removed. Accordingly, the first slab $1a$ has opaque lines $5a$ defining a zero. The second slab $1b$ has opaque lines $5b$ thereon defining the number one, etc. The last slab $1z$ has opaque lines $5z$ thereon arranged simply as opaque lines without any interruptions therein for reasons which are discussed hereinafter. The electrodes of each of the slabs $1a$, etc. are connected by respective wires $4a$, etc. to a selective programmer 10. The programmer 10 selectively applies a potential to the electrodes of the slabs $1a$, etc. to produce the aforesaid contraction of the piezoelectric slab. The programmer 10 may be any suitable apparatus for selectively applying a potential to a plurality of output lines; such as a group of pushbuttons for selectively completing a circuit between a potential source and the electrodes of the slabs $1a$, etc.

A transparent shutter grating 11 has opaque lines 12 thereon arranged to correspond in number, size, and position with the opaque lines on the slabs $1a$, etc. The shutter 11 and the slabs $1a$, etc. are supported on a rigid structure (not shown) with the surfaces having the opaque lines in parallel alignment with each other. This arrangement is effective to produce a substantially rectangular package comprising a stack of the slabs $1a$, etc. with the leads $4a$, etc. emerging therefrom for connection to the programmer 10.

In FIG. 3, there is shown a modified structure for the display element shown in FIG. 1. This modified element includes a piezoelectric crystal 15 having a pair of electrodes 16 and 17 attached thereto. A pair of wires 18 are used to connect the electrodes 16, 17 to a source of potential. The piezoelectric crystal 15 is joined to a slab of transparent material 19; e.g., glass, having opaque lines 20 thereon. The opaque lines 20 are arranged on one surface of the slab 19 transversely to a potential induced direction of motion "A" of the crystal 15.

In operation, all the slabs 1a, etc., except the last slab 1z, are arranged to have the opaque lines of each slab in mutual alignment when the programmer 10 is not energizing any of the electrodes 2a, 3a, etc. This arrangement is effective to produce a plurality of paths for radiant energy through the stack of slabs 1a, etc. since the transparent sections are in mutual alignment.

The last slab 1z is arranged, in an unenergized position, to have its opaque lines 5z aligned with the aforesaid aligned transparent sections of the other slabs 1a, etc. This position of the last slab 1z will prevent any radiant energy from passing out of the end of the stack of the slabs 1a, etc. through the transparent portions of the other slabs. However, since the opaque areas of each slab have been interrupted to leave transparent areas to define a desired representation, some stray radiant energy would pass through these areas and appear at last slab 1z. Since the transparent areas of the last slab 1z are in alignment with the aligned opaque areas of the other slabs 1a, etc., the aforesaid stray radiant energy would pass through the transparent areas of the last slab 1z. Accordingly, the shutter grating 11 is arranged to have its opaque lines in alignment with the transparent areas of the last slab 1z to prevent any radiant energy from leaving the stack of slabs 1a, etc. This, of course, means that the transparent areas of the grating 11 are in alignment with the transparent areas of all the slabs except 1z.

To display a desired representation with the present invention, the programmer 10 is actuated to energize a desired one of the figured slabs 1a, etc. Assume the second slab 1b is energized by applying a signal potential to the electrodes of the second slab 1b. This potential is effective to produce a contraction of the slab 1b as previously discussed with relation to FIG. 1. This contraction is arranged to produce a motion "A" of the slab such that opaque lines 5b of the second slab 1b occupy a new position occupied by the transparent portions of slab 1b before the energizing potential was applied. In other words, the crystal contracts in the "A" direction to move the opaque areas a distance equal to one line in the "A" direction. This movement is effective to bring the opaque areas of the second slab 1b in alignment with the aligned transparent areas of the remaining slab 1z, etc. In order to view the representation defined by the opaque areas of the second slab 1b, the last slab 1z is now energized by the application of a potential to its electrodes. Since the opaque areas of the last slab were aligned with the aligned transparent portions of the other slabs 1a, etc., the contraction of the last slab 1z by means of the applied potential is effective to align the opaque areas of the last slab 1z with aligned opaque areas of the other slabs 1a, etc. Since the transparent areas of the shutter 11 are aligned with the transparent areas of the non-energized position of the slabs 1a, etc., the representation of the second slab 1b may be viewed at end of the stack of slabs 1a, etc. as a partial obscuring of the radiant energy passing through the transparent areas of the slabs 1a, etc. The viewing of the representation may be done by passing visible light through the transparent areas. Alternatively, in the case of quartz slabs, ultra-violet light may be passed through the transparent areas of the quartz slab for printing the representation on an ultra-violet sensitive recording surface.

To return the display indicator to the non-indicating position, the potentials are removed from the selected slab 1b and the last slab 1z to allow them to expand to their former length. This expansion is effective to realign the opaque and transparent areas of the slabs and shutter 11 in the arrangement discussed above to terminate the passage of the radiant energy.

Accordingly, it may be seen that there has been presented, in accordance with the present invention, an improved display indicator actuated by a piezo-electric means for selectively displaying a desired representation for either direct visual viewing or ultra-violet recording.

What is claimed is:

1. A display indicator comprising a plurality of stacked display elements, each of said elements comprising a transparent piezo-electric slab, a pair of electrodes attached to said slab and arranged to be connected to a potential source to produce a contraction of said slab by the application of a potential to said electrodes, and a plurality of transparent and opaque areas arranged on a surface of said slab in a fixed predetermined pattern, said transparent areas of said elements in an unenergized state being arranged in mutual alignment and a programmer connected to said pair of electrodes of each of said elements for selectively applying an energizing signal potential to said elements.

2. A display indicator comprising a plurality of stacked display elements, each of said display elements comprising a piezo-electric slab transparent to radiant energy, a pair of electrodes attached to said slab and arranged to be connected to a potential source to produce a contraction of said slab by the application of a potential to said electrodes, and a plurality of alternating transparent and opaque lines on a surface of said slab having a common width and extending transversely to the potential induced contraction of said slab, said transparent lines of said elements in an unenergized state being arranged in mutual alignment and a programmer connected to said pair of electrodes of each of said elements for selectively applying an energizing signal potential to said elements.

3. A display indicator as set forth in claim 1 and including a shutter means comprising a transparent piezoelectric shutter slab, a pair of electrodes attached to said slab and to said programmer for applying an energizing potential from said programmer to said slab to produce a contraction of said slab, a plurality of alternating transparent and opaque lines on a surface of said slab, said lines having a common width and arranged in a regular pattern transversely to the potential induced contraction of said slab and a stationary transparent grating means having alternating transparent and opaque lines on a surface of said grating means arranged in a pattern substantially identical with the pattern on said shutter slab and positioned in alignment with said shutter slab to substantially align said transparent lines of said shutter slab in an unenergized condition with said opaque lines of said grating means.

References Cited in the file of this patent

UNITED STATES PATENTS

| | | |
|---|---|---|
| 2,596,752 | Williams | May 13, 1952 |
| 2,705,903 | Marshall | Apr. 12, 1955 |
| 2,920,529 | Blythe | Jan. 12, 1960 |
| 2,924,981 | Critchlow | Feb. 16, 1960 |
| 2,936,381 | Long | May 10, 1960 |
| 2,997,922 | Kaprelian | Aug. 29, 1961 |